J. H. DORAN.
PACKING FOR STEAM TURBINES.
APPLICATION FILED JAN. 4, 1919.
1,315,822.
Patented Sept. 9, 1919.
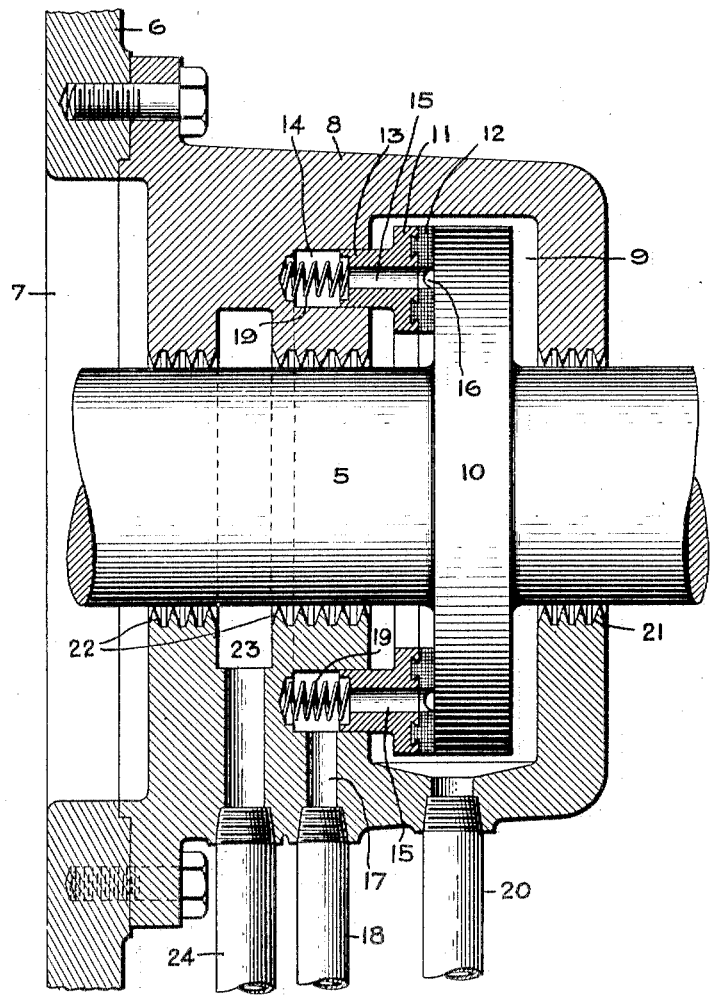
Inventor
John H. Doran,
by *Albert G. Davis*
His Attorney.

UNITED STATES PATENT OFFICE.

JOHN H. DORAN, OF SCHENECTADY, NEW YORK, ASSIGNOR TO GENERAL ELECTRIC COMPANY, A CORPORATION OF NEW YORK.

PACKING FOR STEAM-TURBINES.

1,315,822.

Specification of Letters Patent.  Patented Sept. 9, 1919.

Application filed January 4, 1919. Serial No. 269,660.

*To all whom it may concern:*

Be it known that I, JOHN H. DORAN, a citizen of the United States, residing at Schenectady, in the county of Schenectady, State of New York, have invented certain new and useful Improvements in Packings for Steam-Turbines, of which the following is a specification.

The present invention relates to packings such as are used to prevent leakage between two relatively rotating parts one of which surrounds the other and particularly to packings to prevent leakage between a rotating shaft such as a turbine shaft and the casing through which it passes.

The object of my invention is to provide an improved structure in a packing of this character and for a consideration of what I believe to be novel and my invention, attention is directed to the following description and the claims appended thereto.

In the drawing, the figure is a sectional view illustrating my invention.

Referring to the drawing, 5 indicates a rotating shaft and 6 a casing having an opening 7 through which the shaft passes. These may be the shaft and casing of an elastic fluid turbine or other machine. Connected to casing 6 at the periphery of opening 7 is a housing 8 having end walls through which shaft 5 passes. Housing 8 provides a packing chamber 9 and in chamber 9 is a packing collar 10 carried by shaft 5. Engaging collar 10 is an annular packing plate 11 having a surfacing 12 of suitable bearing material. Plate 11 has an annular projection 13 which is located in an annular groove 14 formed in an end wall of casing 8, and extending axially through projection 13 and plate 11 are a number of holes 15 which communicate with an annular groove 16 in the face of plate 11. Communicating with annular groove 14 is a passage 17 to which is connected a pipe 18 leading from a suitable source of fluid supply such as a supply of water under pressure. In groove 14 are a number of springs 19 which press packing plate 11 toward packing collar 10. Connected to chamber 9 is a drain pipe 20 which may lead to any suitable point. Between shaft 5 and the openings in the ends of casing 8 through which it passes are suitable packings 21 and 22 which are preferably of the labyrinth type. Packing 22 is preferably divided into two parts with an annular space 23 between from which leads a drain pipe 24.

In operation, fluid, such as water, is supplied by pipe 18 to annular groove 14 from which it flows through holes 15 to groove 16. Here the fluid divides part flowing toward the inside of annular plate 11 and part toward the periphery thereof. The fluid may be supplied under pressure to pipe 18 by means of a suitable pump having its suction side connected to a supply reservoir and drain pipes 20 and 24 may lead back to such supply reservoir if found desirable. This as will be clear forms a seal around shaft 5 between the inside and the outside of casing 6 and will prevent leakage either into or out of casing 6. The projection 13 forms in substance a piston against which the fluid in groove 14 exerts a pressure to force the packing plate 11 against the packing disk 10, and the amount of the pressure can be regulated by varying the area of the surface exposed to such pressure. The pressure exerted on projection 13 by the fluid is supplemented by the pressure of springs 19.

The water or other fluid forced out between the face of plate 11 and the surface of collar 10 serves to provide a lubricating film between them to minimize friction and prevent wear. The purpose of packing 21 is to prevent leakage of fluid from chamber 9 to the outside, or vice versa. The purpose of packing 22 is to prevent leakage into the turbine casing of water from the packing and to break down the pressure in cases where the pressure in the turbine casing is very much above that in chamber 9. In the latter instance if the pressure in the turbine casing is quite high such as is met with for example at the high pressure end of a steam turbine then the packing 22 may be made of such size and character as to break the pressure down to a point where the liquid seal can most efficiently handle it.

In accordance with the provisions of the patent statutes, I have described the principle of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:—

1. In a packing, the combination of relatively rotating parts, annular members carried by said parts and engaging each other over a comparatively wide surface, and means for supplying a ring of fluid to the engaging surfaces between their edges from which place the fluid divides and flows in opposite directions toward such edges.

2. In a packing, the combination of a shaft, a casing having an opening through which the shaft passes, a collar on the shaft, an annular packing plate carried by the casing and engaging said collar, and means for supplying a ring of liquid to the engaging surfaces between the edges of the packing plate from which place the liquid divides and flows in opposite directions toward the edges of said annular packing plate.

3. In a packing, the combination of a shaft, a housing through the ends of which the shaft passes, said housing having a chamber therein, a collar on the shaft and within said chamber, an annular packing plate carried by the housing and having a surface which engages said collar, and means for supplying liquid to said engaging surfaces about a ring between the edges of said packing plate.

4. In a packing, the combination of a shaft, a housing through the ends of which the shaft passes, said housing having a chamber therein, a collar on the shaft and within said chamber, an annular packing plate carried by the housing and having a surface which engages said collar, means for holding the packing plate in yielding engagement with said collar, and means for supplying liquid to said engaging surfaces about a ring between the edges of said packing plate.

5. In a packing, the combination of a shaft, a housing through the ends of which the shaft passes, said housing having a chamber therein and an annular groove in one end wall which groove opens into said chamber, a collar on the shaft and within said chamber, a packing member having a surface which engages such collar and a portion located in said groove, and means for supplying fluid under pressure to said groove, said packing member having passages for conveying fluid from said groove to the engaging surfaces.

6. In a packing, the combination of a shaft, a housing through the ends of which the shaft passes, said housing having a chamber therein and an annular groove in one end wall which groove opens into said chamber, a collar on the shaft and within said chamber, a packing member having a surface which engages said collar and a portion located in said groove, means for supplying fluid under pressure to said groove which fluid acts to force the packing member into engagement with the collar, said packing member having passages for conveying fluid from said groove to a point midway between the edges of said packing member, the fluid dividing at such place and flowing in opposite directions.

7. In a packing, the combination of a shaft, a housing through the ends of which the shaft passes, said housing having a chamber therein and an annular groove in one end wall which groove opens into said chamber, a collar on the shaft and within said chamber, a packing member having a surface which engages said collar and a portion located in said groove, means for supplying fluid under pressure to said groove which fluid acts to force the packing member into engagement with the collar, said packing member having passages for conveying fluid from said groove to a point midway between the edges of said packing member, the fluid dividing at such place and flowing in opposite directions, and packing means between the casing ends and the shaft.

In witness whereof, I have hereunto set my hand this 3rd day of January, 1919.

JOHN H. DORAN.